United States Patent [19]
Ruskin

[11] 3,825,755
[45] July 23, 1974

[54] GAUGE FOR POLYMERS
[75] Inventor: Wallace R. Ruskin, Blacklick, Ohio
[73] Assignee: Infra-Data, Inc., Columbus, Ohio
[22] Filed: Nov. 13, 1972
[21] Appl. No.: 305,990

[52] U.S. Cl. .............................. 250/339, 250/349
[51] Int. Cl. ............................................ G01t 1/16
[58] Field of Search .................... 250/339, 349, 350

[56] References Cited
UNITED STATES PATENTS
3,405,268  10/1968  Brunton .............................. 250/339
3,597,755  8/1971  Parkin ................................ 250/350

Primary Examiner—Archie R. Borchelt
Assistant Examiner—Davis L. Willis
Attorney, Agent, or Firm—Fay & Sharpe; David B. Deioma

[57] ABSTRACT

A gauge for measuring the thickness of plastic film including an infrared radiation source transmitting light through or reflecting it from the film to reference and absorption photoconductive detectors. A signal generator is operatively connected to the detectors and causes modulation of the electrical signals emanating therefrom. Amplifiers and filters act on the signals and a comparator receives the signals from the reference and absorption detectors and gives an indication of the thickness of the film.

8 Claims, 2 Drawing Figures

PATENTED JUL 23 1974

3,825,755

GAUGE FOR POLYMERS

BACKGROUND OF THE INVENTION

In the production of various types of plastic or polymeric film it is important to maintain the thickness within certain limits. Accordingly, it has been a long-standing problem to measure the thickness of either static or moving film reliably, quickly and inexpensively. It is also highly advantageous if the measurement device is small and easily movable.

In the past, infrared radiation has been filtered and then transmitted through a plastic film or reflected from it, and subsequently detected by a photoelectric detector. In order to maximize the signal-to-noise ratio, the infrared radiation to the photoconductive detectors has been mechanically modulated by a "chopper wheel." A chopper wheel is a circular device having apertures therein which has traditionally been used to modulate the signal. It is positioned between the source of infrared radiation and the film and rotated to alternately block and permit transmission of the radiation. The use of a mechanical chopper produces inherent limitations in the thickness gauges. Mechanical choppers heat up, require water cooling, and are generally large and unwieldy. As a result, past thickness and other gauges for plastic film have not been entirely satisfactory.

This invention solves the problem of modulation of the infrared signal by use of electronic circuitry rather than mechanical wheels. By use of a sinusoidal, square or other modulating wave directly connected to a reference and absorption detector, the size is reduced, the efficiency increased and the cost minimized. Water cooling is eliminated because temperatures are lower and the gauge can be air cooled. The gauge of this invention is also highly sensitive, accurate and can be used with either transmitted or reflective infrared radiation.

The inherent advantages of the gauge of this invention also have the potential of using infrared radiation that each body inherently emanates for a measurement of its thickness or other parameter. That is, while an infrared lamp is now used as a source of the infrared radiation, it is possible to use the present gauge without any artificial infrared source.

SUMMARY OF THE INVENTION

A gauge for measuring a parameter of a film. An infrared source of radiation transmits light to a reference detector and an absorption detector. Filters between the source of radiation and the detectors permit one of the detectors to be used as a reference by making it independent of the parameter being measured. A means for programming the detectors is operatively connected thereto and combines a modulated wave with the signal from the detectors. A means for operating on the signals from the first and second detectors give a measurement of the parameter to be measured.

DETAILED DESCRIPTION OF THE DRAWINGS

Figures 1, 2:
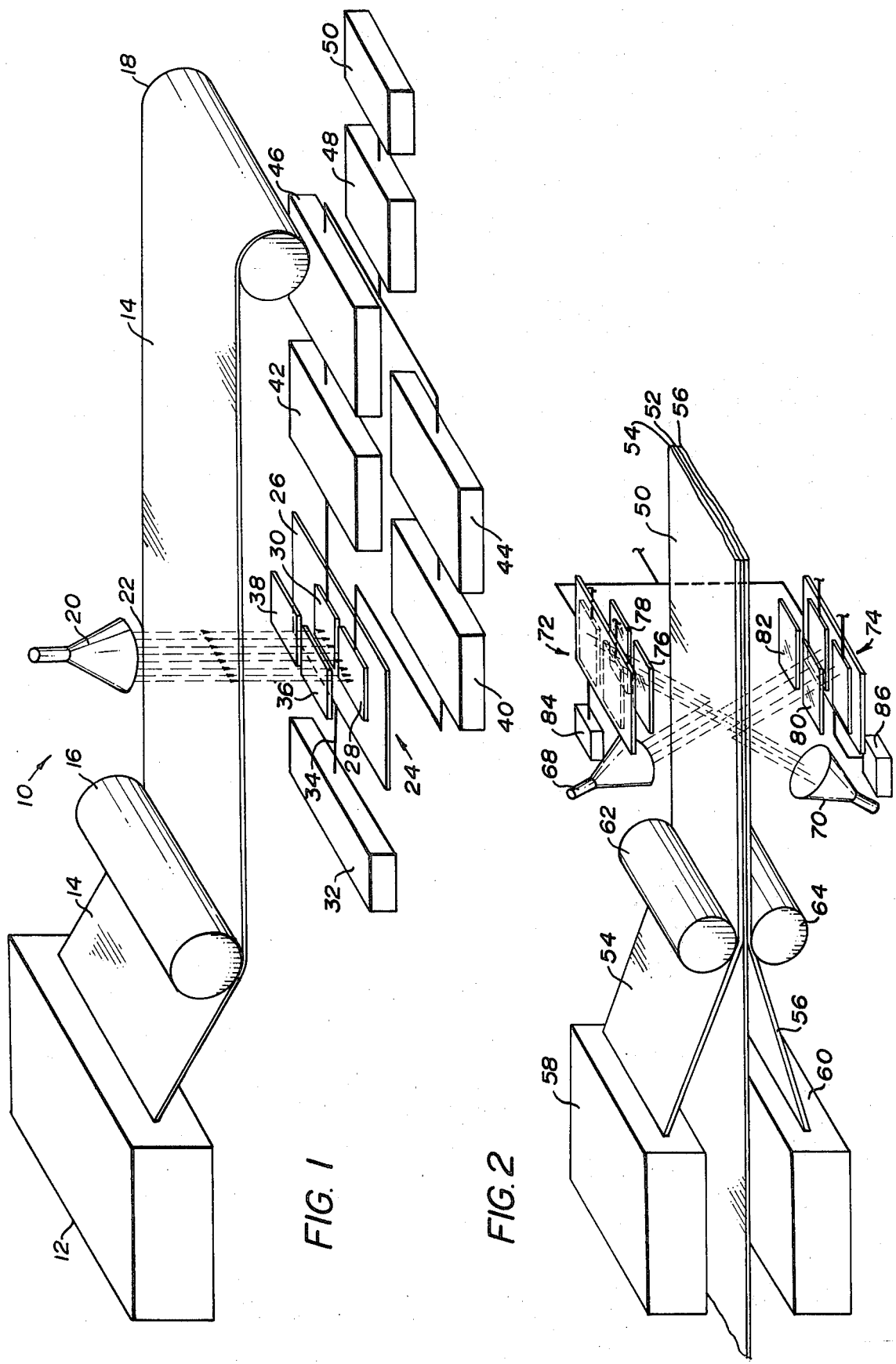
FIG. 1 is a schematic representation of the thickness gauge of this invention.
FIG. 2 is a schematic view of an alternate embodiment of the thickness gauge.

FIG. 1 shows a system 10 which has a continuous source 12 of plastic film 14. The source 12 may be a manufacturing facility or any other type of unit which would be used in conjunction with the measurement of plastic film 14. A roller 16 holds the film 14 in slight tension. As the film 14 travels to the wrapping roller 18, it passes between a source of infrared radiation which is an infrared lamp 20 transmitting infrared radiation 22 through the plastic film 14 to a detection system indicated generally as 24.

The detection system 24 includes a commercially available photoconductive material which gives an electrical signal in proportion to the amount of light it receives. In this invention, however, the detector 24 is a composite having common base 26 and segmented elements 28 and 30. It should be understood that completely separate photoconductive materials could be utilized. The reason for the use of a common base 26 is to minimize any differences between the signals from the first and second detectors 28 and 30 due from inherent chemical characteristics. Electrically, however, the elements 28 and 30 which shall be referred to hereinafter as detectors are separately connected to other electrical components in the system.

In this invention, as in the prior art, a modulating means is used to maximize the signal-to-noise ratio. Completely different from past thickness gauges, however, the modulation is accomplished by a means for programming 32, one type of which is a signal generator. This invention works successfully with a sinusoidal and square wave generator but it is anticipated that other signals may be utilized successfully. It is important to note at this point that the use of this electronic signal generator, which produces a carrier wave, inherently gives this invention significant advantages over the prior art. It completely eliminates the use of mechanical modulators, water cooling, bulkiness and other inherent limitations. Separate signal generators may be used for each of the detectors if it should be advantageous. More than two detectors can also be used to measure different parameters of the film. While this invention is described with reference to a thickness gauge, it is also capable of utilization in measuring moisture in the film as well as other parameters.

Filters 36 and 38 determine the particular function of the detectors 28 and 30. Filter 36 transmits only radiation having a wave length of about 2.25 microns ($10^{-4}$ cm.). This wave length has been found to be generally independent of the thickness of the film 14. Because the infrared radiation received by the first detector 28 is independent of the thickness of the film 14, it acts as a reference detector. The filter 38 is chosen so that it transmits radiation in proportion to the thickness of the film 14. The filter 38 transmits radiation having a wave length of about 2.40 microns.

It is known in the art that filters 36 and 38 can be chosen to transmit and absorb different wave lengths of radiation and, thus, utilize the detectors 28 and 30 to measure different parameters. For example, different filters at different frequencies can permit the detectors to measure the moisture content of plastic film.

It is also possible that once the sensitivity of the detectors is sufficient, infrared radiation inherently emanating from an object could be measured without the use of the infrared source 20.

The filters used in this invention are of the wide band variety and have a band of plus or minus 0.05 microns and may be as wide as plus or minus 0.10 microns.

The detectors 28 and 30 are operatively connected to and transmit first and second combined signals to a first and second means for operating 40 and 42, respectively, which may include a first and second D.C. filter to reduce noise and appropriate amplifiers. The means for operating also includes A.C. filters to remove the carrier wave produced by the signal generator 32.

The first and second means for operating 40 and 42 are operatively connected to and transmit first and second resultant signals to first and second A.C. to D.C. converters 44 and 46, respectively. Converters 44 and 46 take the resultant signals from the filters 40 and 42 and convert them to an average D.C. value. These average D.C. values are then combined by means of a comparator 48 which is a well known, commercially available device which may take either the ratio, sum or difference of the signals. An appropriate display or recording device 50 such as a voltmeter or oscilloscope gives an indication of the thickness of the plastic film 14. The means for operating 40 and 42, converters 44 and 46, comparator 48 and display means 50 comprise the means for producing a signal which is an indication of the parameter being measured.

FIG. 2 illustrates an alternate embodiment of the invention which utilizes a composite sheet 50 having a substrate 52 with layers 54 and 56 of film on either side thereof. In this embodiment, the layers 54 and 56 of film emanate from sources 58 and 60, respectively, and are squeezed onto the common substrate 52 by rollers 62 and 64. As the film proceeds down the line, infrared sources 68 and 70, above and below the sheet 50, transmit infrared radiation which is reflected to sets of detectors indicated as 72 and 74, respectively. Filters 76, 78, 80 and 82 are used in conjunction with the detectors as described above to transmit radiation which will give a measurement of parameters, such as thickness and moisture. In this embodiment, the top detector 72 will measure the thickness of the film 54 and the bottom detector 74 will measure the thickness of the film 56. Signal generators 84 and 86 provide carrier signals to sets of detectors 72 and 74, respectively, as discussed above. Each set of combined signals is transmitted to circuitry which acts in the same manner as described with respect to FIG. 1. The signals from the top set of detectors 72 is not normally combined with the signals from the bottom set of detectors 74 since the measure parameters of different films.

A significant advantage of this invention relates to the "passive" measurements of parameters whereby the inherent infrared radiation from the material under examination is used to make qualitative and quantitative measurements of these parameters. This is attained by two means. First, the detection method which is the basic feature of this invention permits an unlimited expansion of the detector matrix from two to that number of filter detector combinations necessary to provide the selectivity of infrared radiation characterizing these parameters. This is accomplished without the penalties of costly mechanical redesign and the expense of size and weight. Signal multiplexing techniques, in conjunction with state of the art signal processing, can allow this invention to expand easily into an infrared spectrum analyzer for complete evaluation of the material under examination.

Second, the basic measurements that can be made with this embodiment allow simultaneous sampling of the same area under observation thereby improving the correlation of measurements of a number of parameters. This invention permits this with the smallest sample area attainable today.

It should be understood that variations in the filters, detectors and electrical apparatus may be used without varying from the scope of this invention.

I claim:

1. A gauge for measuring a parameter of a film comprising:
   a source of infrared radiation;
   a first detector which receives the radiation and gives an electrical response in proportion to the radiation received;
   a second detector which receives the radiation and gives an electrical response in proportion to the radiation received;
   a first filter between the first detector and the film, the first filter transmitting a radiation which is subsequently independent of the parameter being measured;
   a second filter transmitting a different radiation which is proportional to the parameter of the film being measured, the second filter being located between the film and the second detector;
   means for programming the detectors with a carrier wave, the means for programming including a signal generator operatively electrically connected to the first and second detectors, the signal generator generating the carrier signal to the first and second detectors and combining with the responses from the first and second detectors to produce a first and second combination signal; and
   means for producing signals from the first and second detectors to give a measurement of the parameter being measured including means for operating on the first and second combination signal to filter out the carrier wave, the means for operating operatively connected to the first and second detectors.

2. The gauge of claim 1 wherein the parameter to be measured is thickness,
   the first filter only permits the transmission of infrared radiation which is not significantly affected by variations in thickness of the film,
   the first detector thus receiving radiation from the first filter and acting as a reference detector,
   the second filter permits the transmission of infrared radiation which is proportional to the thickness of the film,
   the second detector thus receiving radiation which is in proportion to the thickness of the film.

3. The gauge of claim 2 wherein the means for producing includes amplifiers and first and second carrier filters which are operatively connected to the first and second detectors to remove the carrier signals from the combination signals to produce a first and second resultant signal, converters to change the first and second resultant signal to an average D.C. resultant signal; and means for comparing the first and second average D.C. resultant signals to determine the thickness of the film.

4. The gauge of claim 3 wherein the signal generator is sine wave generator.

5. The gauge of claim 4 wherein first and second detectors are photoelectric devices mounted on a common base in order to minimize any differences in their outputs due to inherent characteristics of the photoelectric devices.

6. The gauge of claim 5 wherein the means for comparing first and second resultant signals is operatively connected to a means for displaying the comparison of the first and second average D.C. signals.

7. The gauge of claim 6 wherein the source of radiation is an infrared lamp on the opposite side of the film from the first and second detectors in order that the infrared radiation is transmitted through the film.

8. The gauge of claim 6 wherein the source of radiation is an infrared lamp on the same side of the film as the first and second detectors, the detectors and infrared lamp being relatively positioned so that the detectors receive reflected infrared light from the film.

* * * * *